United States Patent [19]
Ozeki et al.

[11] Patent Number: 5,258,572
[45] Date of Patent: Nov. 2, 1993

[54] DISTRIBUTING BOX FOR UNDERGROUND CABLES

[75] Inventors: Shotaro Ozeki; Masakazu Kawanabe, both of Fukuoka, Japan

[73] Assignee: Saito Denki Sangyo Co., Ltd., Fukuoka, Japan

[21] Appl. No.: 765,560

[22] Filed: Sep. 25, 1991

[30] Foreign Application Priority Data

Sep. 27, 1990 [JP] Japan .................. 2-259793

[51] Int. Cl.5 .................. H02G 9/10; E02D 29/00
[52] U.S. Cl. .................. 174/38; 174/37; 174/39; 52/19; 52/20; 52/21; 52/100; 52/220.1
[58] Field of Search .......... 174/37, 38, 39; 52/19, 52/20, 21, 98, 99, 100, 220, 221, 594

[56] References Cited

U.S. PATENT DOCUMENTS

| | | | |
|---|---|---|---|
| 1,793,038 | 2/1931 | Zimmermann | 174/37 X |
| 3,129,396 | 4/1964 | Germain et al. | 174/50 X |
| 3,263,378 | 8/1966 | Dorris | 52/20 |
| 3,731,448 | 5/1973 | Leo | 174/37 X |
| 4,607,469 | 8/1986 | Harrison | 52/220 |
| 4,732,397 | 3/1988 | Gavin | 52/21 X |

FOREIGN PATENT DOCUMENTS

| | | | |
|---|---|---|---|
| 3400576 | 8/1984 | Fed. Rep. of Germany | 174/37 |
| 3423184 | 1/1986 | Fed. Rep. of Germany | 174/37 |

Primary Examiner—Leo P. Picard
Assistant Examiner—Hyung S. Sough
Attorney, Agent, or Firm—Thomas R. Morrison

[57] ABSTRACT

A distributing box for laying a cable duct is dealt with in the construction field so that, after laying the cable duct, the box is sealed with mortar and then-buried in the ground. Accordingly, the distributing box should desirably be set up in the construction field with ease. Underground water must not permeate the distributing box which has been buried in the ground. In the present invention, therefore, a distributing adapter which is mounted in the wall of a concrete box is constructed of a case which has a back plate, a partition wall which divides the interior of the case into a plurality of areas, a flange which is formed at the periphery of the case, and marks for drilling positions, which are put on the rear surface of the back plate.

18 Claims, 5 Drawing Sheets

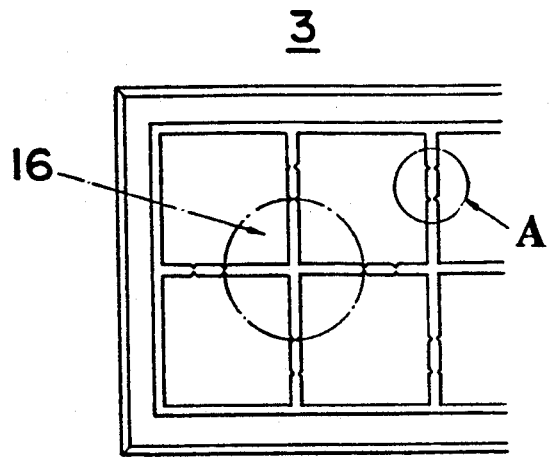
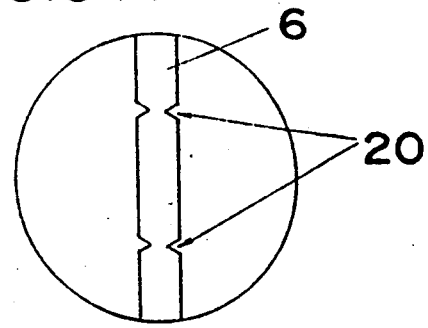
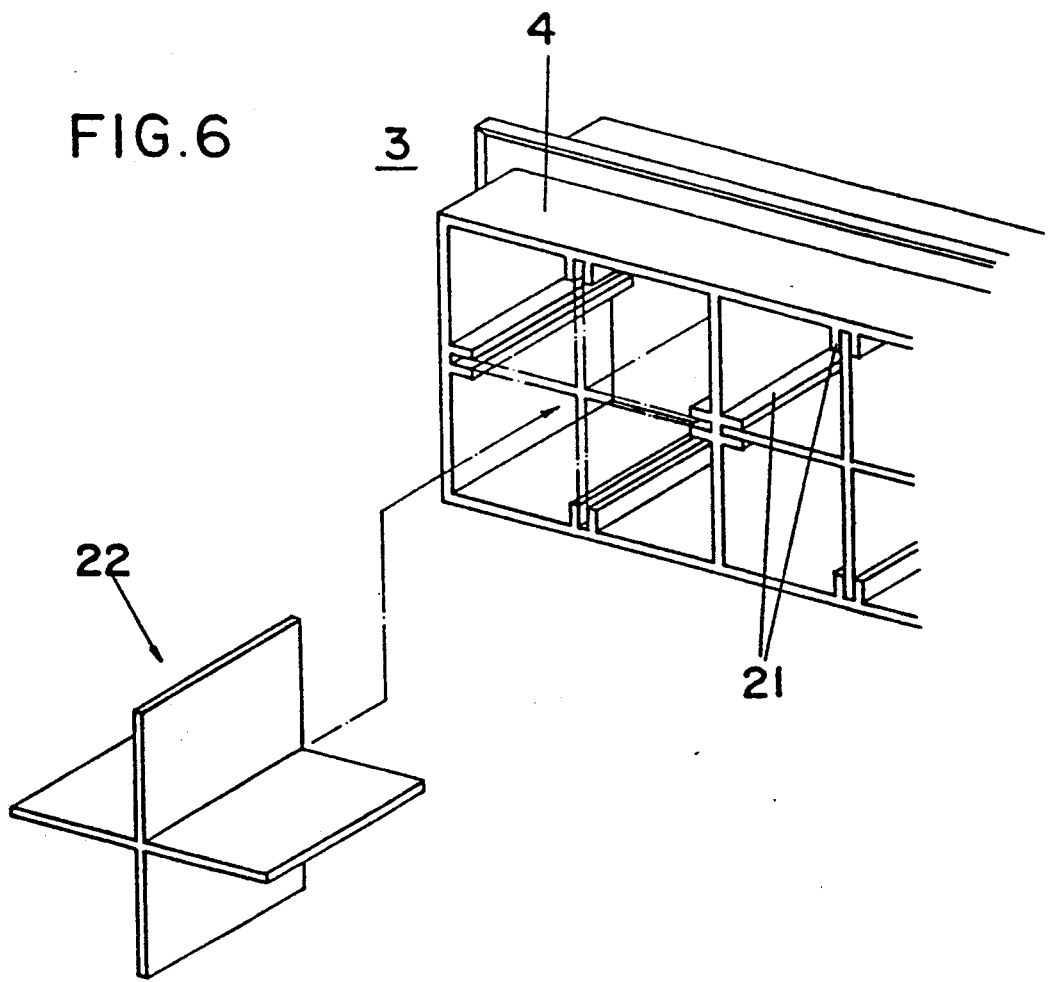

DISTRIBUTING BOX FOR UNDERGROUND CABLES

BACKGROUND OF THE INVENTION

1. Field of the Invention

The present invention relates to a distributing box for underground cables. More particularly, it relates to the structure of a distributing box in which an insertion hole for underground cables can be easily bored and can also be easily closed up.

2. Description of the Prior Art

A distributing box in which underground cables are disposed, is usually made of concrete. In burying the distributing box in the ground, an insertion hole is provided in the side wall of this box by an electric drill or the like, and a cable duct is inserted into the insertion hole.

Since the distributing box is constructed of concrete to be rigid, the prior art requires extensive labor and time on the drilling of the insertion hole. In addition, after the cable duct has been inserted into the insertion hole, this insertion hole is coated and filled up with mortar or the like. In this case, defects in the execution are likely to occur because the mortar coating disperses.

OBJECTS AND SUMMARY OF THE INVENTION

It is accordingly an object of the present invention to provide a distributing box for underground cables which eliminates the problems of the prior art.

In order to accomplish the object, the present invention consists of a mounted a distributing adapter (3) in the wall of a concrete box (1). The adapter (3) is constructed including a case (4) which has a back plate (7), and a partition wall (6) which divides the interior of the case (4) into a plurality of areas or sections (5).

According to the above construction, an insertion hole (12 or 16) for a cable duct (10) can be easily bored in the adapter (3). In addition, a paste (13) such as mortar or resin is packed into the area(s) (5) defined by the partition wall (6) after the cable duct (10) has been inserted into the insertion hole (12 or 16), or the cable duct (10) having a filler member which has been mounted on part of this duct (10) beforehand is inserted into the insertion hole (12 or 16), whereby the insertion hole (12 or 16) can be reliably closed up, and yet, the cable duct (10) can be firmly fixed.

BRIEF DESCRIPTION OF THE DRAWINGS

FIGS. 1 thru 4 illustrate an embodiment of the present invention, in which FIG. 1 is a perspective view of a distributing box, and FIGS. 2, 3 and 4 are a perspective view, a sectional view and a front view of an adapter, respectively;

FIG. 5 is a front view of an adapter in another embodiment;

FIG. 5(A) is an enlargement of the circled portion of FIG. 5 marked A.

FIG. 6 is a perspective view of an adapter in still another embodiment; and

DETAILED DESCRIPTION OF THE PREFERRED EMBODIMENTS

Embodiments of the present invention will now be described with reference to the drawings.

Embodiment 1

Figure 1:
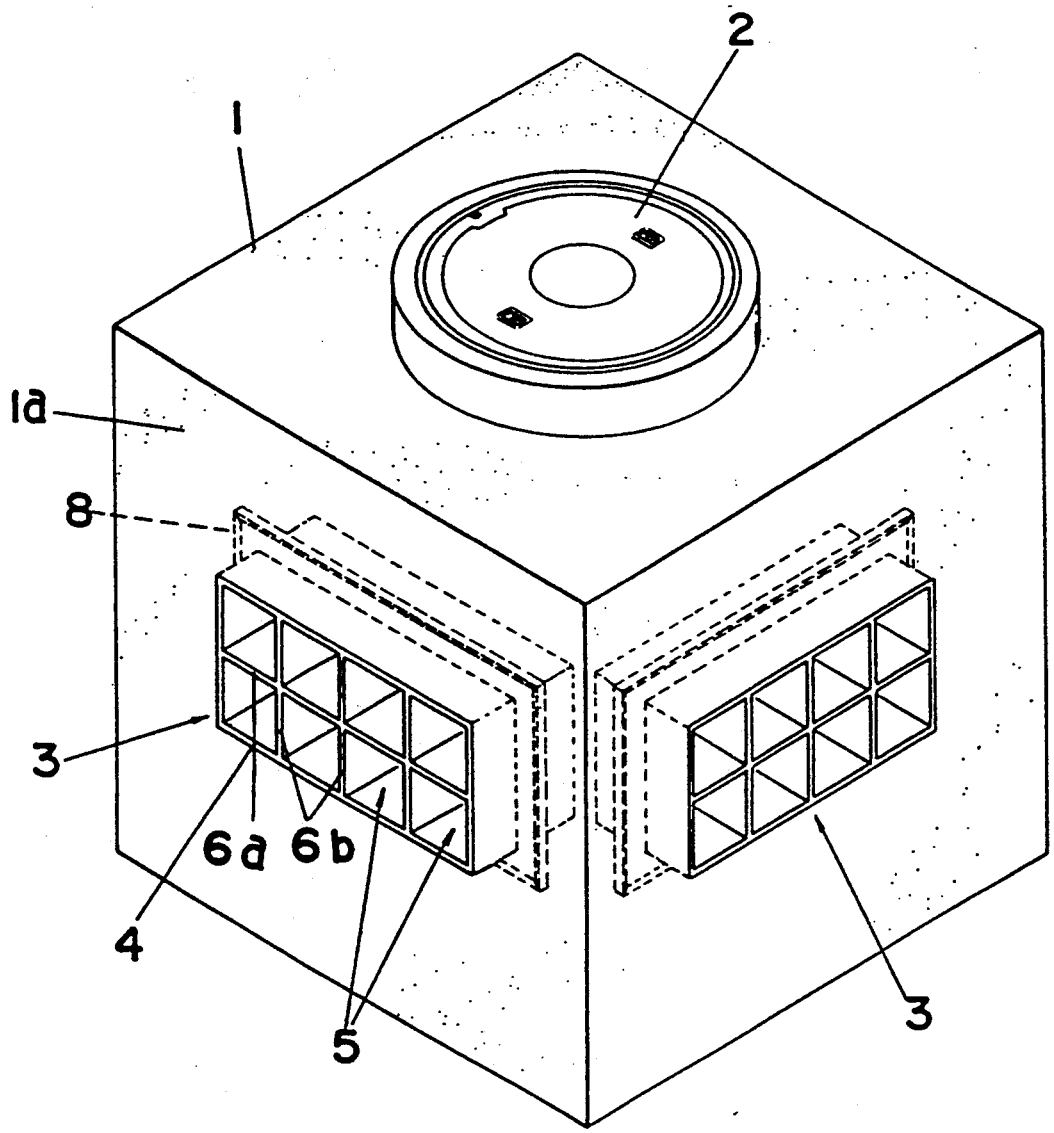

FIG. 1 is a perspective view of a distributing box in this embodiment. The distributing box is constructed fabricated of a rigid concrete box 1. A cover 2 is placed on the upper surface of the box 1, and is exposed at the surface of the ground in which the box 1 is buried.

Figure 2:
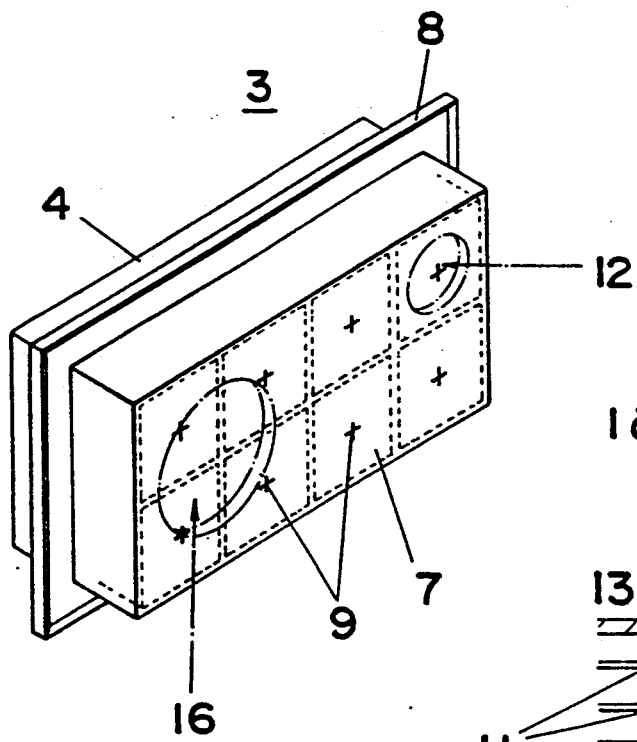

Numeral 3 designates each distributing adapter which is mounted in the side wall 1a of the box 1. The adapter 3 is principally made of a box-shaped case 4, inside of which a partition wall 6 for dividing the space of the case 4 into a plurality of areas or sections 5 is formed in the shape of a lattice. The partition wall 6 is configured of a horizontal partition plate 6a and vertical partition plates 6b. Besides, as best shown in FIG. 2, a back plate 7 is formed on the rear side of the case 4, and a flange 8 is protrusively provided around the case 4.

Figure 3:
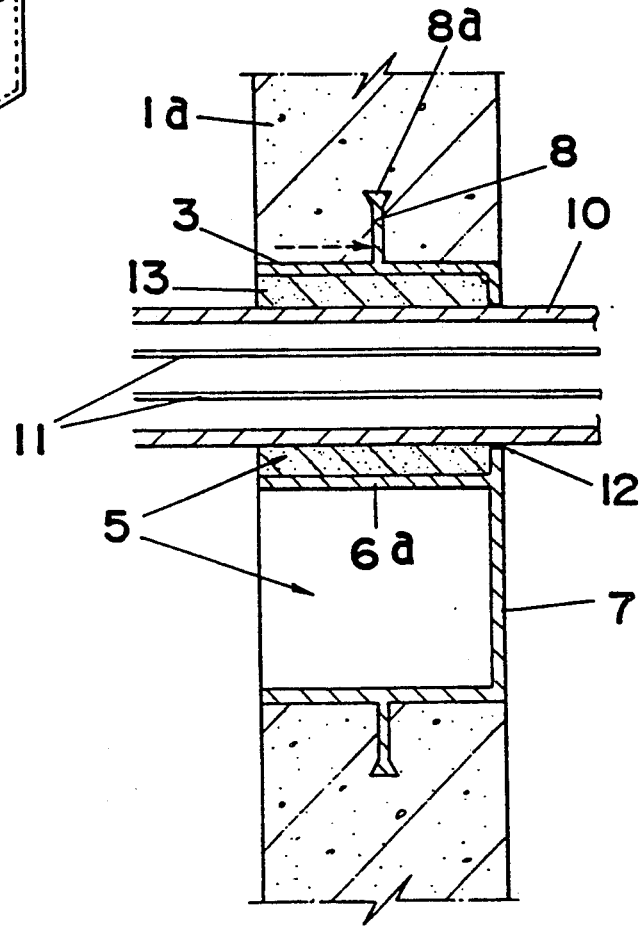

The adapter 3 is formed into a thin structure by the use of a material which is less strong than concrete, for example, synthetic resin, so that it can be provided with insertion holes 12 and 16 easily penetrated by a tool such as and electric drill. Marks 9 for drilling positions are put on the back plate 7. In forming the box 1 by concrete placing, the adapter 3 is embedded in the concrete, thereby making it uniform with the box 1 as shown in FIG. 3. Herein, the flange 8 functions as means for preventing the adapter 3 from falling off the side wall 1a and as a cutoff means for preventing underground water (indicated by a broken-line arrow in FIG. 3) from invading the interior of the box 1. In order to enhance the water cutting-off effect of the flange 8, the outer edge part thereof is formed with a wedge-like enlarged portion 8a.

Numeral 10 in FIG. 3 designates a cable duct, through which cables 11 are passed. The cable duct 10 is inserted into the insertion hole 12 provided in the adapter 3. After the insertion, the area 5 surrounding the cable duct 10 is filled up with a paste 13 such as mortar or resin, thereby making up the interspace between the cable duct 10 and the circumference of the insertion hole 12. Moreover, since the paste 13 hardens, the cable duct 10 is firmly fixed.

Figure 4:
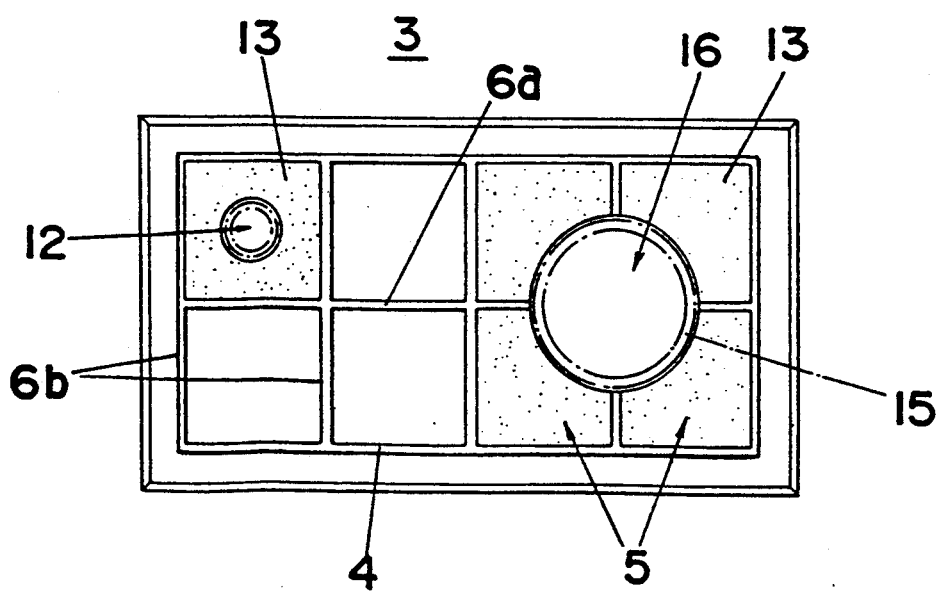

When filled up with the paste 13 in this manner, the area 5 in which the back plate 7 is drilled can be stopped reliably without interfering with laying a duct. Meanwhile, as best shown in FIG. 4, when the cable duct 15 has a large diameter, the large-diameter insertion hole 16 is drilled extending over two or more of the areas 5, and these areas 5 surrounding the cable duct 15 are filled up with the paste 13. As understood from the foregoing, according to the adapter 3, the cable duct 10 can be laid with ease.

Embodiment 2

Referring to FIGS. 5 and 5(A), a partition wall 6 is formed with notches 20. An insertion hole 16 can be easily bored by cutting away the partition wall 6 at the notches 20.

Embodiment 3

Referring to FIG. 6, the case 4 of an adapter 3 is formed with fitting grooves 21. In addition, a cross-shaped partition wall 22 is prepared separately from the case 4. Thus, the partition wall 22 can be detachably fitted into the fitting grooves 21. When the partition wall 22 is detached from the case 4, an insertion hole 12 or 16 can be easily drilled in a back plate 7.

Embodiment 4

Figure 7:
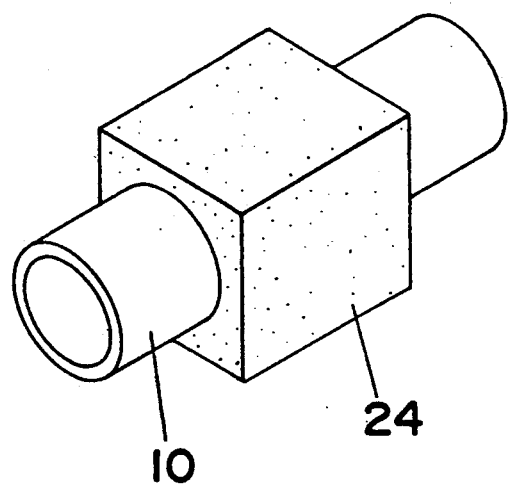
FIGS. 7 and 8 are a perspective view and a sectional view, respectively, for explaining yet another embodiment.
Figure 8:
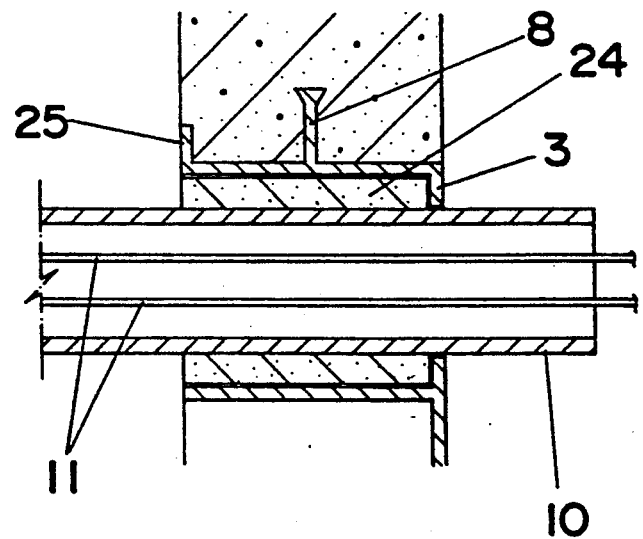

Referring to FIG. 7, a box shaped filler member 24 is mounted around part of a cable duct 10. The filler member 24 is made of an elastic watertight material, such as sponge or rubber, which has the property that it swells when impregnated with underground water. As seen from FIG. 8, the filler member 24 is put in the area 5 of an adapter 3. When the filler member 24 has become impregnated with the underground water, it swells to prevent the water from invading the interior of a box 1. Owing to such a filler member 24, it is not necessary to pack a paste 13 into the area 5, and duct laying can be efficiently carried out. Shown at numeral 25 is a second flange for cutting off water.

As described above, the present invention consists of a distributing adapter formed of a case which has a back plate, and a partition wall which divides the interior of the case into a plurality of areas or sections. Therefore, a cable duct can be laid promptly and reliably without interfering with the execution of duct laying.

What is claimed is:

1. A distributing box for underground cables comprising:
    a concrete box having a wall;
    a distributing adapter extending through said wall;
    said adapter including a case;
    a back plate substantially sealing an end of said case;
    at least one partition wall dividing said case internally into a plurality of areas wherein said partition wall formed with notches;
    a flange at a periphery of said case;
    said flange being embedded into the concrete of said wall;
    at least said back plate being marked to designate at least one location thereon where a drill hole can be made for a cable duct to pass through said case and said back plate; and
    said plurality of areas being effective for sealing of said distributing adapter against leakage of liquid therethrough.

2. A distributing box for underground cables as defined in claim 1, wherein said adapter is fabricated of a synthetic resin into a thin structure.

3. A distributing box for underground cables as defined in claim 1, wherein said adapter is made unitary with said concrete box.

4. A distributing box for underground cables as defined in claim 1, wherein an outer edge of said flange includes a wedge-shaped portion.

5. A distributing box for underground cables as defined in claim 1, wherein said adapter further includes a second flange at an outermost part of said case.

6. A distributing box according to claim 1, wherein said means for permitting drilling includes a plurality of marks on said back panel, said marks indicating drilling positions effective for starting said at least one hole through said back plate in a predetermined relationship to said at least one partition wall.

7. A distributing box according to claim 1, wherein said means for permitting drilling includes said back plate being of a material that can be drilled.

8. A distributing box according to claim 7, wherein said material includes a plastic resin.

9. A distributing box for underground cables comprising:
    a concrete box having a wall;
    a distributing adapter extending through said wall;
    said adapter including a case;
    said case being formed with fitting grooves;
    a back plate substantially sealing an end of said case;
    at least one partition wall dividing said case internally into a plurality of areas;
    said partition wall being a cross-shaped partition wall which is fitted into said fitting grooves;
    a flange at a periphery of said case;
    said flange being embedded into concrete of said wall;
    at least said back plate including means for permitting drilling therethrough for the insertion of a cable duct passing through said case and said back plate; and
    said plurality of areas being effective for sealing of said distributing adapter against leakage of liquid therethrough.

10. A distributing box for underground cables as defined in claim 9, wherein said adapter is fabricated of a synthetic resin into a thin structure.

11. A distributing box for underground cables as defined in claim 9, wherein said adapter is made unitary with said concrete box.

12. A distributing box for underground cables as defined in claim 3, wherein an outer edge of said flange includes a wedge-shaped portion.

13. A distributing box according to claim 9, wherein said means for permitting drilling includes a plurality of marks on said back panel, said marks indicating drilling positions effective for starting said at least one hole through said back plate in a predetermined relationship to said at least one partition wall.

14. A method for installing underground cables comprising the steps of:
    providing a distributing box having a concrete box with a wall, a distributing adapter including a case, a back plate with means for permitting drilling therethrough substantially sealing an end of said case, at least one easily removable partition wall dividing said case internally into a plurality of areas and a flange embedded into concrete of said wall at a periphery of said case;
    drilling at least one hole through said back plate;
    inserting at least one cable duct through said at least one hole into said box;
    sealing said distributing adapter between walls defining at least one of said plurality of areas and said at least one cable duct against leakage of liquid therethrough; and
    inserting at least one cable through said at least one cable duct.

15. The method of claim 14, further comprising filling the area around said at least one cable duct with a filler member.

16. The method of claim 14, wherein the step of sealing includes making use of a sealing paste.

17. The method of claim 14, wherein the step of sealing includes employing a material that swells into sealing contact upon exposure to water.

18. The method of claim 14, wherein the step of sealing includes employing material preformed into a shape substantially filling a portion of at least one of said plurality of areas and placing said material into sealing conformity with a cable passing therethrough.

* * * * *